United States Patent [19]

Fujita et al.

[11] Patent Number: 5,317,518
[45] Date of Patent: May 31, 1994

[54] METHOD OF PLOTTING LOADED CONDITIONS

[75] Inventors: Naoki Fujita; Kota Miyamoto, both of Yamanashi, Japan

[73] Assignee: Fanuc Limited, Yamanashi, Japan

[21] Appl. No.: 856,047
[22] PCT Filed: Sep. 6, 1991
[86] PCT No.: PCT/JP91/01190
§ 371 Date: May 12, 1992
§ 102(e) Date: May 12, 1992
[87] PCT Pub. No.: WO92/05480
PCT Pub. Date: Apr. 2, 1992

[30] Foreign Application Priority Data

Sep. 13, 1990 [JP] Japan .................................. 2-243129

[51] Int. Cl.$^5$ .................... G06F 15/46; G05B 19/405
[52] U.S. Cl. .......................... 364/474.26; 364/474.12; 364/474.17; 364/474.22
[58] Field of Search ...................... 364/474.22, 474.23, 364/474.24–474.17, 191–193, 188, 189, 474.26, 474.17, 474.12; 318/569, 570; 395/131, 161; 340/701–704

[56] References Cited

U.S. PATENT DOCUMENTS

| | | | |
|---|---|---|---|
| 4,521,860 | 6/1985 | Kanematsu et al. | 364/474.26 |
| 4,646,228 | 2/1987 | Ikeda | 364/474.26 X |
| 4,831,542 | 5/1989 | Shima et al. | 364/474.26 |
| 4,887,221 | 12/1989 | Davis et al. | 364/474.24 X |
| 5,126,646 | 6/1992 | Fujita et al. | 364/474.26 X |

FOREIGN PATENT DOCUMENTS

| | | |
|---|---|---|
| 58-66118 | 4/1983 | Japan . |
| 01-53207 | 3/1989 | Japan . |
| 1-140947 | 6/1989 | Japan . |

Primary Examiner—Joseph Ruggiero
Attorney, Agent, or Firm—Staas & Halsey

[57] ABSTRACT

A loaded condition plotting method capable of simultaneously and promptly recognizing a motor loaded current value and a point being machined with accuracy is provided. During the cutting operation using a spindle motor controllable by a numeric control system executing a machining program, there is decided one region under which a spindle motor load current value periodically detected falls, among four regions consisting of a first region where the spindle motor load current value is less than 80% of the spindle motor rated current, a second region of 80% or more and less than 100%, a third region of 100% or more and less than 130%, and a fourth region of 130% or more. On a plotting image sections of the tool locus determined in accordance with the machining program appear with a workpiece configuration and a tool, the sections being correspondingly plotted in blue when the detected current value is within the first region, in green with the second region, in yellow with the third region, and in red with the fourth region.

6 Claims, 3 Drawing Sheets

METHOD OF PLOTTING LOADED CONDITIONS

TECHNICAL FIELD

The present invention relates to a method of plotting a loaded condition under a machining operation, and more particularly, is directed to a loaded condition plotting method capable of simultaneously displaying a motor load current value and a point being machined during the machining operation.

BACKGROUND ART

In the known prior art, during the cutting operation using a motor controllable by a numerical control system as the drive source, a load current flowing through the motor is displayed in the form of a bar graph, or alternatively the fluctuation waveform of the motor load current with a lapse of time is displayed in a graph so that the operator can grasp the cutting state. When the motor load current is displayed in a bar graph, the operator reads a point being machined from the abscissa of the graph while reading a motor load current value shown in the ordinate of the graph, to verify the motor load current values at various machined points, thereby grasping the cutting state. Also, in the case where the fluctuation waveform of the motor load current is displayed in a graph, the cutting state can be grasped based on the elapsed time (corresponding to the machined point) and the motor load current value, respectively shown along the axis of abscissas and axis of ordinates of the graph.

According to the conventional loaded condition plotting method, it is, however, difficult in that the operator must simultaneously and promptly grasp the motor load current value and the point being machined with accuracy. Due to this, even though a disorder is found in the motor load current value, the operator cannot promptly judge the machined point where such disorder has occurred.

DISCLOSURE OF THE INVENTION

It is the object of the present invention to provide a loaded condition plotting method in which the operator can simultaneously and promptly grasp a motor load current value and a point being machined with accuracy during a machining operation using a motor as the drive source.

In order to achieve the above object, the present invention provides a method of plotting a loaded condition in machining operation using as a drive source a motor controllable by a numerical control system executing a machining program, the method comprising the steps of:

(a) presetting a plurality of tool locus plotting techniques;

(b) determining a tool locus in accordance with the machining program during the machining operation;

(c) selecting correspondingly one of the plurality of tool locus plotting techniques with respect to each of motor load current values which have been periodically detected during the machining operation; and (d) plotting a portion of the tool locus determined in the step (b) which corresponds to each of the detected motor load current value, onto a display screen in the tool locus plotting technique selected in the step (c).

In the step (a), preferably, the plurality of tool locus plotting techniques in the step (a) are each set correspondingly to a plurality of motor load current regions obtained by segmenting a range where the motor load current varies. The plurality of tool locus plotting techniques are different from each other in at least any one of plotting color, kind of line, and luminance. More preferably, the plurality of motor load current regions are obtained on the basis of the rated motor current. In the step (c), the motor load current to be detected is a current flowing through either of a spindle motor driving a tool or a workpiece and a servomotor driving a tool rest or a workpiece rest.

According to the present invention as described above, one of the plurality of tool locus plotting techniques which have been previously set, is correspondingly selected with respect to each of the motor load current values periodically detected during the machining operation, and then each portion of the tool locus, which has been determined in accordance with a machining program, is plotted on a display screen in the selected tool locus plotting technique. Therefore, the operator can grasp a point being machined and a motor load current simultaneously and accurately during the machining operation. This enables the operator to optimally adjust the load during the machining, which leads to a prevention of tool breakage and a provision of a satisfactory machined surface.

The tool locus is preferably plotted using a tool locus plotting technique which corresponds to the detected value of the load current flowing through either of a spindle motor for driving a tool or a workpiece or a servomotor for driving a tool rest or a workpiece rest, selected from a plurality of tool locus plotting techniques which are set in advance so as to correspond to each of a plurality of motor load current regions obtained by segmenting a region where the motor load current varies, on the basis of the rated motor current, and are different from each other in at least any one of plotting color, kind of line, and luminance. As a result, an accurate motor load current data can be applied to the tool locus, which permits the operator to easily recognize the machining state more precisely.

BEST MODE FOR CARRYING OUT THE INVENTION

Figure 1:
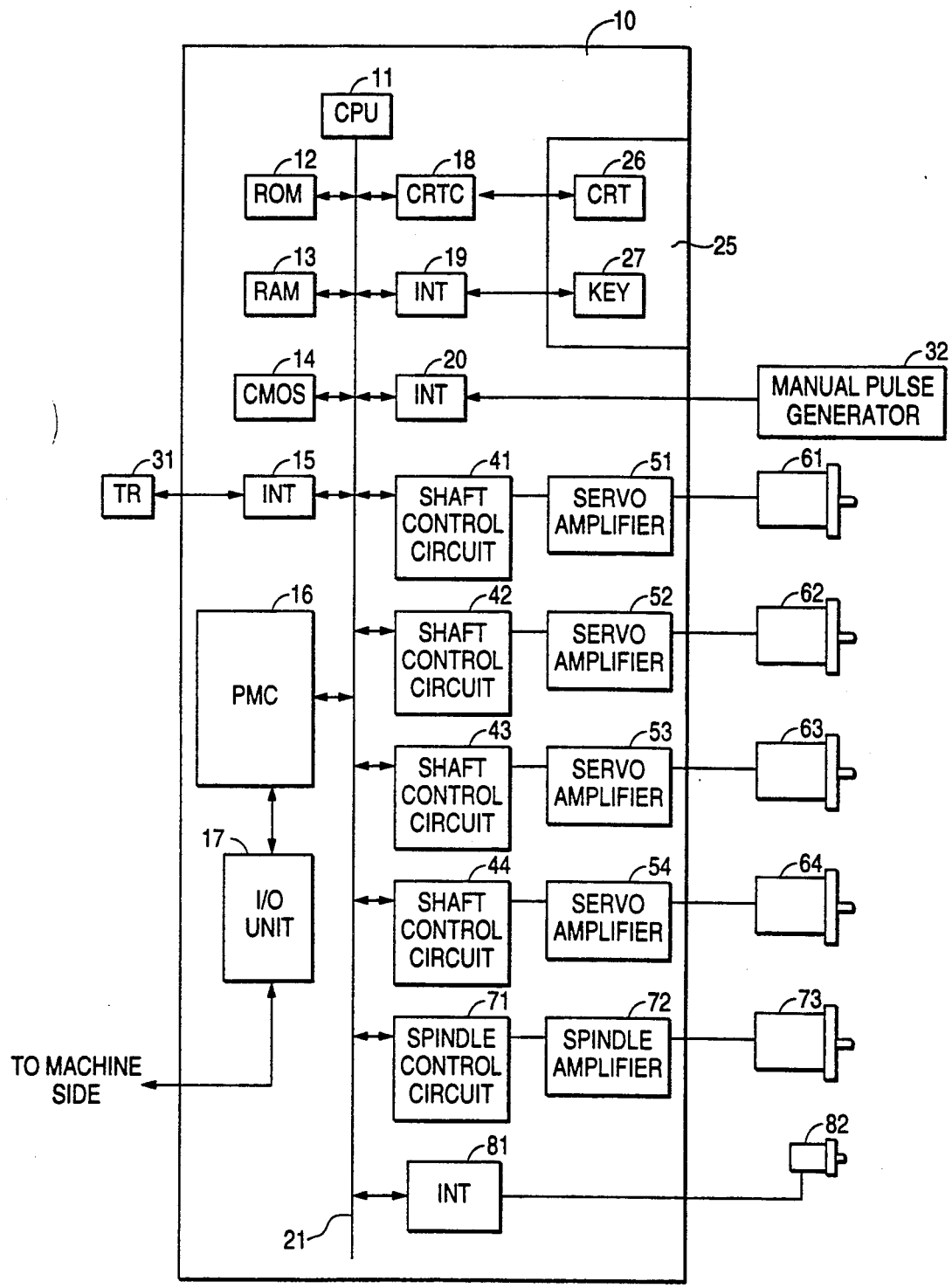
FIG. 1 is a block diagram showing a numerical control system for practicing the loaded condition plotting method in accordance with an embodiment of the present invention.

A method of plotting a loaded condition embodying the present invention is executed by, for example, a computerized numerical control (CNC) system generally designated reference numeral 10 in FIG. 1.

A machine tool which is operated under the control of the numerical controller 10, comprises a spindle motor 73 for rotating a tool, shaft servomotors 61 to 64 each incorporating a pulse coder (not shown) for detecting a position, a variety of actuators (not shown) including a solenoid valve, a hydraulic valve, and a pneumatic valve, sensors (not shown) such as a limit switch, and a machine operating panel (not shown). The spindle motor 73 linked with a tool not shown is fixed to a tool rest (not shown) which is in turn drivingly connected to the corresponding servomotors 61 to 64. The machine operating panel is provided with a manual pulse generator 32 for precisely positioning a machine movable part by hand, and switches (not shown) including an overriding switch for manually controlling the tool feed speed or the revolving speed of the spindle. The revolving shaft of the spindle motor 73 is associated with a position coder 82 by way of a gear train or a belt (not shown).

Referring now to FIG. 1, the CNC system 10 comprises a central processing unit (CPU) 11, a read-only memory (ROM) 12 storing a system program or the like for use in the entire control of the CNC system, a random access memory (RAM) 13 comprising, for example, SRAM and used to temporarily store calculation data, display data or any other data, and a nonvolatile memory 14 comprising, for example, a battery back-up CMOS (complementary metal-oxide semiconductor), the memories 12 to 14 being connected to the CPU 11 via a bus 21. The nonvolatile memory 14 stores, for example, machining programs, various parameters, amounts of tool compensation, amounts of pitch error compensation, workpiece configuration data, plotting color data and the like.

The plotting color data, which are used in the plotting process as described later, represent plotting colors corresponding to a plurality of motor load current regions, respectively, obtained by segmenting the range where a spindle motor current (which will be defined in detail later) varies on the basis of the rated current of the spindle motor 73. In this embodiment, plotting colors of blue, green, yellow and red are preset correspondingly to a first region where the motor load current is less than 80% of the rated current, a second region where it is 80% or more and less than 100% of the rated current, a third region where it is 100% or more and less than 130%, and a fourth region where it is 130% or more, respectively.

The CNC system 10 is further connected to an external device 31 including, for example, a paper-tape reader and a paper-tape punch by way of an interface 15 so that a machining program can be read from the paper-tape reader into the CNC system 10 and the machining program compiled in the CNC system 10 can be outputted to the paper-tape punch.

Also, the CNC system 10 incorporates a programmable machine controller (PMC) 16 which is connected to the CPU 11 through the bus 21 and is connected to a control panel switch, actuators and sensors of the machine tool through an input-output (I/O) unit 17. The PMC 16 has a memory (not shown) storing sequential programs which are created in, for example, ladder diagram, and is intended to issue signals generated based on the sequential program in response to the control output from the CPU 11 associated with M function, S function, and T function which are instructed by the machining program, to the machine side, thereby actuating the actuators. The PMC 16 also inputs signals from the sensors and the control panel switch, and transfers them to the CPU 11.

The CNC system 10 further comprises a graphic control circuit 18 for converting into image signals digital data such as current positional data of each shaft, image data, alarms, and parameters which are transmitted from the CPU 11, and includes interfaces 19 and 20, and a manual data input unit 25. The input unit 25 includes a display device 26 having a CRT screen and executing display action in accordance with the image signals from the graphic control circuit 18, and a key board 27 for the input of data by the operator, the data input through the key board 27 being transmitted to the CPU 11 by way of the interface 19. The interface 20 is connected to the manual pulse generator 25 so as to input the pulse signals from the pulse generator 25.

The CNC system 10 further comprises shaft control circuits 41 and 44 for inputting respective shaft displacement commands issued from the CPU 11, and servo amplifiers 51 to 54 for the drive control of the servomotors 61 to 64. Pulse trains are fed back as position signals from pulse coders (not shown) mounted on the servomotor 61 to 64, and subjected to the frequency/velocity conversion to generate speed signals. The CNC system 10 also comprises a spindle control circuit 71 for inputting spindle rotation commands, spindle orientation commands and the like from the CPU 11 to send forth spindle speed signals; and a spindle amplifier 72 for rotating the spindle motor 73 at the commanded rotation speed in accordance with the spindle speed commands and for positioning the spindle at the commanded position in response to the orientation commands. It further comprises an interface 81 for inputting feed-back pulses sent forth from a position coder 82 with the rotation of the spindle motor 73 so that the CPU 11 can input the feed-back pulses from the position coder 82 in the case where the corresponding servomotors 61 to 64 are rotated in synchronism with the spindle motor 73 to perform, for example, a threading operation.

Figure 2:
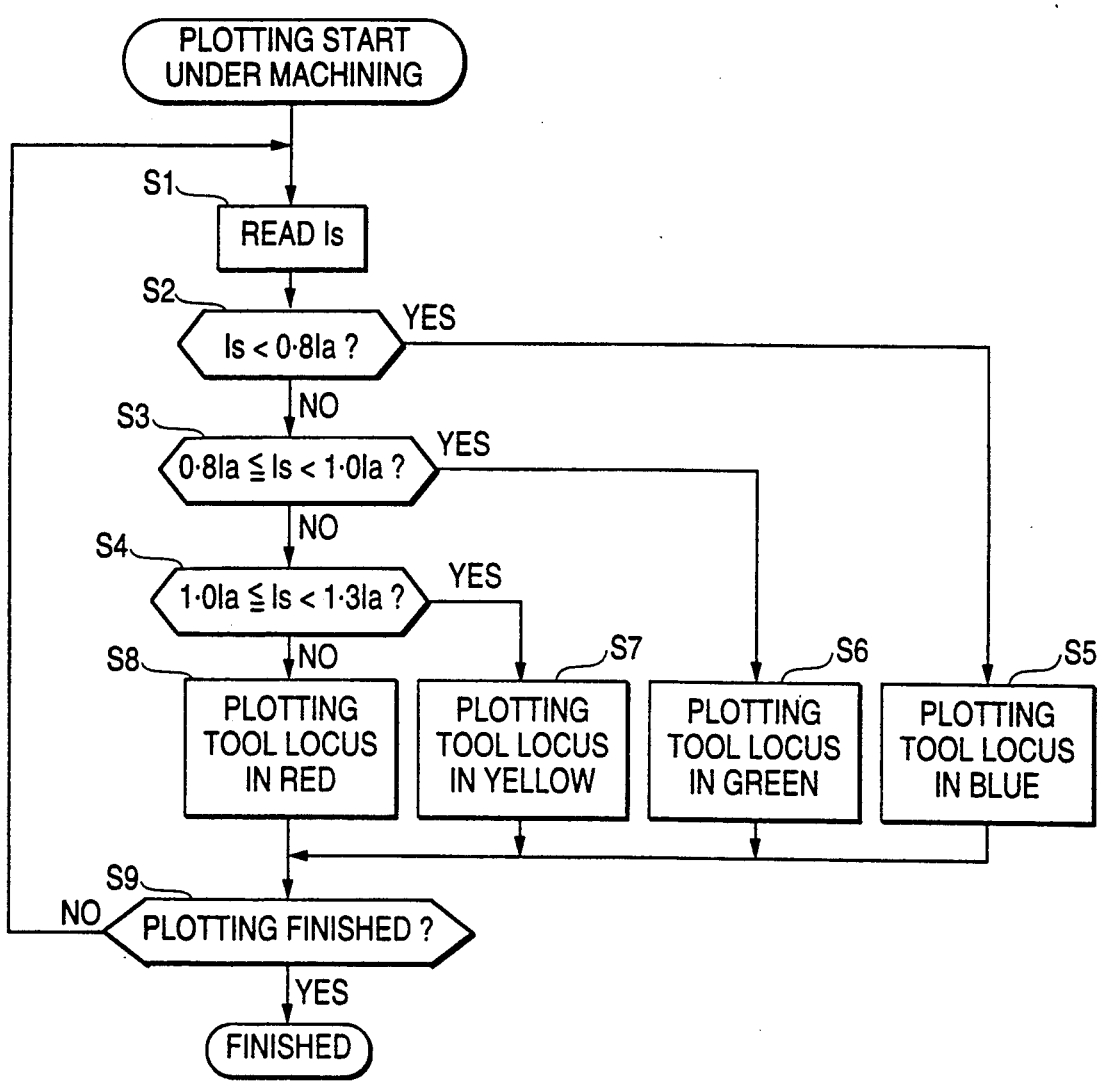
FIG. 2 is a flow chart showing a plotting process which is carried out by the numerical control system.
Figure 3:
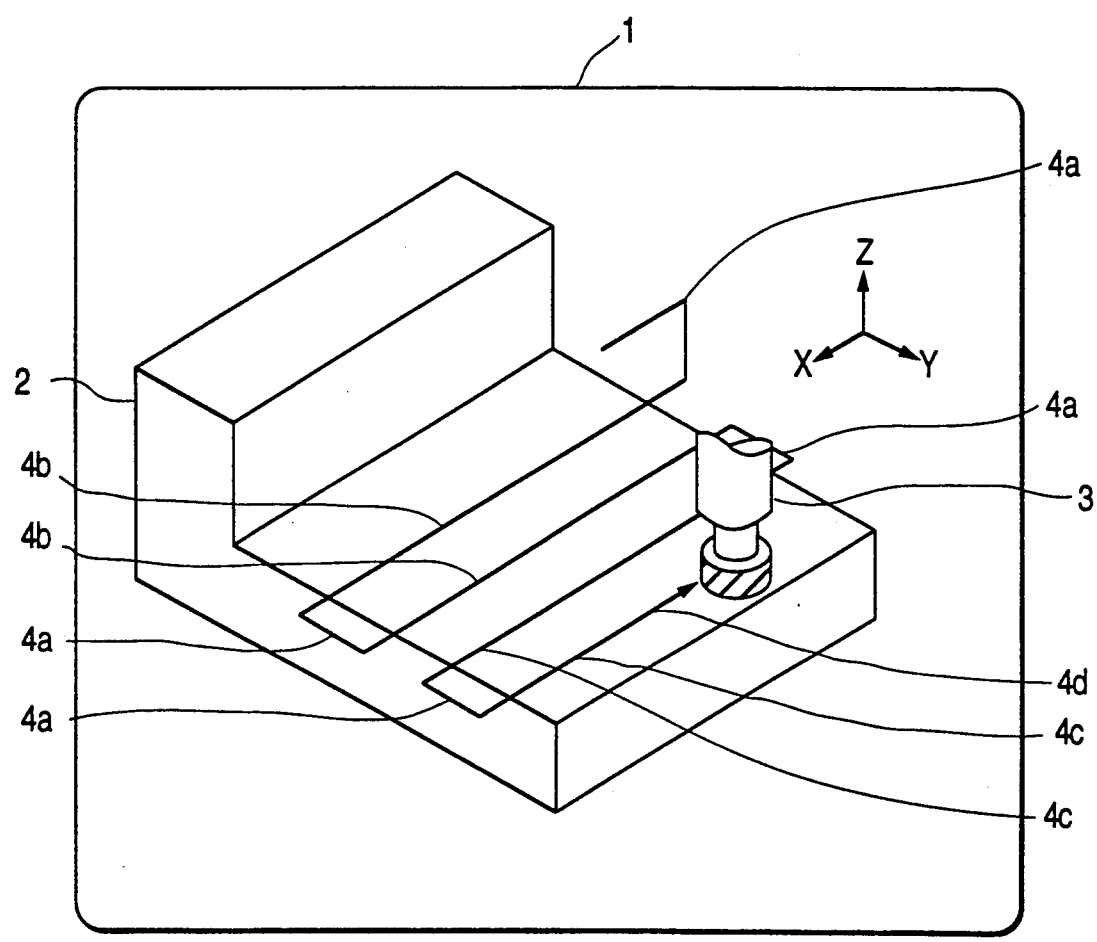
FIG. 3 is a drawing illustrating the content plotted on the display screen of the numerical control system.

With reference to FIGS. 2 and 3, description will be hereinbelow made of mainly the action of the CNC system 10 plotting the loaded condition.

The machining program is executed by the CPU 11 of the CNC system 10, to perform, for example, a cutting operation by means of the machine tool under the control of the CNC system 10. During the cutting operation, the CPU 11 reads separately a plurality of data blocks constituting a machining program for execution. When a displacement command is contained in one of the read data blocks, the CPU 11 calculates tool locus data representing a locus of the object tool in a tool displacement section corresponding to the displacement command in accordance with the displacement commands and the tool compensation amount, and then drivingly controls the corresponding servomotors 61 to 64 through the corresponding shaft control circuit 41 to 44 and the servo amplifier 51 to 54 associated with the tool rest feed so that the tool can travel along the object tool locus. In compliance with the spindle speed signals emitted from the spindle control circuit 71 responsive to the spindle rotation command issued from the CPU 11, the spindle amplifier 72 rotates the spindle motor 73 and the tool drivingly connected to the spindle motor at the instructed rotation speed, thereby causing the workpiece to be cut by the tool.

During this cutting operation, cutting load applied to the tool varies, which leads to a change in the desired output torque of the spindle motor 73. This allows the current supplied from the spindle amplifier 72 to the spindle motor 73 (hereinafter, referred to as a spindle motor load current) to be varied.

Conducting the above-mentioned tool feed control, the CPU 11 executes a plotting process as shown in FIG. 2 at the same cycle as, for example, the tool locus calculation process described above. During the cutting operation, the CRT screen of the display device 26 displays a machining state plotting image (generally designated reference numeral 1 in FIG. 3) for plotting the tool locus containing a loaded condition display information, and the workpiece configuration.

In the first plotting cycle, the CPU 11 transmits workpiece configuration data acting as image data to the graphic control circuit 18. As a result, a workpiece image 2 representing the workpiece configuration previous to the machining operation is displayed with a tool image 3 in the plotting image 1. Subsequently, the CPU 11 reads a spindle motor load current value $I_s$ from the spindle control circuit 71 (Step S1 in FIG. 2) to decide whether the load current $I_s$ lies within the first region less than 80% of the rated current $I_a$ of the spindle motor 73 (Step S2). If the result in Step S2 is NO, the CPU 11 decides whether the load current $I_s$ lies within the second region of 80% or more and less than 100% of the rated current $I_a$ (Step S3). If this decision is also NO, the CPU 11 further decides whether the current value lies within the third region of 100% or more and less than 130% of the rated current $I_a$ (Step S4).

When it is judged in Step S2 that the spindle motor load current $I_s$ lies within the first region, the CPU 11 transmits to the graphic control circuit 18 image data consisting of the tool locus data with respect to a data block which has been found in the first tool locus calculation process, and the plotting color data (blue) corresponding to the first region (Step S5). Then, in accordance with the image signals emitted from the graphic control circuit 18, the configuration of the workpiece being machined (generally designated reference numeral 2 in FIG. 3) appears on the plotting image 1 while a tool locus concerning one data block is plotted in blue. Also, when it is judged in Step S3 that the load current $I_s$ lies within the second region, the CPU 11 issues tool locus data and plotting color data corresponding to the second region (Step S6), thereby plotting the configuration of the workpiece while plotting the tool locus in green. When judged in Step S4 that the load current $I_s$ lies within the third region, the CPU 11 sends forth tool locus data and plotting color data corresponding to the third region (Step S7), thus plotting the configuration of the workpiece as well as plotting the tool locus in yellow. Furthermore, when judged that the load current is out of the third region and hence lies within the fourth region (Step S4), the CPU 11 sends forth tool locus data and plotting color data corresponding to the fourth region (Step S8), thereby plotting the configuration of the workpiece as well as plotting the tool locus in red.

Afterward, it is judged whether the entire plotting of the tool locus has been completed (Step S9). If the result is NO, the procedure returns to Step S1 to repeat the above-described plotting process. It is to be understood that the plotting processes in the later plotting cycles are different from that in the first plotting cycle. That is, in Steps S5 to S8 in each of the later plotting cycles, the CPU 11 sends forth to the graphic control circuit 18 tool locus data and plotting color data associated with each of one or more data blocks which have been hitherto found, in addition to the tool locus data which have been found in the tool locus calculation process just before each plotting cycle, and the associated plotting color data. Consequently, each portion of the tool locus extending from the initiation of machining is allowed to be plotted in the identical plotting color with any other portion or in the different plotting color from any other's.

When it is judged in Step S9 in the later plotting cycle that the entire plotting of the tool locus has been completed, the plotting process comes to an end, providing, for example, a program end command is contained in the data block which has been read just before that plotting process.

FIG. 3 illustrates, by way of example, a plotted content on the plotting image 1 during the cutting operation in the case where the tool feed speed is not manually adjusted by the override switch. In FIG. 3, the first tool locus section 4a corresponds to an approach section extending up to the initiation point of cutting operation, while the other three tool locus sections 4b–4d correspond to corner sections where the tool is not subjected to a cutting load. Therefore, the spindle motor load current $I_s$ in these sections falls under the first region, and hence the four tool locus sections 4a are plotted in blue. Also, in the first and second cutting sections, there is detected a load current $I_s$ which falls under the second region, and the tool locus sections 4b corresponding to these cutting sections are plotted in green. Moreover, in the entirety of the third cutting section and the initial part of the fourth cutting section, there is detected a load current $I_s$ which falls under the third region, and the corresponding tool locus sections 4c are plotted in yellow. In the remainder of the fourth cutting section, detected is a load current $I_s$ which falls outside the first to third region, and the corresponding tool locus section 4d is plotted in red.

As discussed hereinabove, each of the tool locus sections is plotted in a plotting color representing a spindle motor load current $I_s$, and accordingly the operator can simultaneously recognize the point being machined and the loaded condition with accuracy. The operator is also capable of manually adjust, for example, the tool feed speed or the spindle rotation speed in response to a plotting color of the tool locus. Namely, if the tool locus appears in blue, the override switch is manipulated to increase the tool feed speed, and if the tool locus appears in yellow or red, the override switch is operated to reduce the tool feed speed, to consequently change the tool locus into green, thereby carrying out the cutting operation with the optimally adjusted cutting load.

The present invention is not limited to the above-described embodiment, and there will be conceivable a variety of modifications thereof.

For instance, the tool locus sections are plotted in plotting colors different from each other in response to the motor load in the above embodiment, but instead the tool locus sections may be plotted with different kinds of line or luminances from each other. Also, in the above embodiment there is detected a spindle motor load current with respect to the cutting speed, but instead there may be detected a spindle motor load current associated with the tool feed speed and corresponding to the cutting resistance, to thereby perform the same process as the above-described plotting process in accordance with the detected current value. In this case, current values segmenting the range where the servomotor load current varies into a plurality of regions must be preset within the CNC system.

What is claimed is:

1. A method of plotting a loaded condition in machining using as a drive source a motor controllable by a numerical control system executing a machining program, comprising the steps of:

(a) setting a plurality of tool locus plotting techniques in advance;
(b) determining a tool locus in accordance with said machining program during the machining operation;
(c) selecting correspondingly one of said plurality of tool locus plotting techniques with respect to each of motor load current values which have been periodically detected during the machining operation; and
(d) plotting a portion of the tool locus determined in said step (b), which corresponds to each of said detected motor load current values, onto a display screen in the tool locus plotting technique selected in said step (c).

2. A method of plotting the loaded condition according to claim 1, wherein said plurality of tool locus plotting techniques in said step (a) are each correspondingly to a plurality of motor load current regions obtained by segmenting a range where the motor load current varies.

3. A method of plotting the loaded condition according to claim 1, wherein said plurality of tool locus plotting techniques are different from each other in at least one of plotting color, kind of line, and luminance.

4. A method of plotting the loaded condition according to claim 2, wherein said plurality of motor load current regions are obtained on the basis of the rated motor current.

5. A method of plotting the loaded condition according to claim 1, wherein said motor load current to be detected in said step (c) is a current flowing through a spindle motor driving a device selected from a tool and a workpiece.

6. A method of plotting the loaded condition according to claim 1, wherein said motor load current to be detected in said step (c) is a current flowing through a servomotor driving a device selected from a tool rest and a workpiece rest.

* * * * *